United States Patent
Nikolovski et al.

(10) Patent No.: US 8,330,744 B2
(45) Date of Patent: Dec. 11, 2012

(54) METHOD FOR LOCATING A TOUCH ON A SURFACE AND DEVICE FOR IMPLEMENTING THE METHOD

(75) Inventors: Jean-Pierre Nikolovski, Fontenay Aux Roses (FR); Ros Kiri Ing, Paris (FR); Mathias Fink, Meudon (FR)

(73) Assignee: Commissariat a l'Energie Atomique et Aux Energie Alternatives, Paris (FR)

( * ) Notice: Subject to any disclaimer, the term of this patent is extended or adjusted under 35 U.S.C. 154(b) by 178 days.

(21) Appl. No.: 12/451,605

(22) PCT Filed: May 7, 2008

(86) PCT No.: PCT/FR2008/050810
§ 371 (c)(1),
(2), (4) Date: Jul. 21, 2010

(87) PCT Pub. No.: WO2008/142345
PCT Pub. Date: Nov. 27, 2008

(65) Prior Publication Data
US 2010/0283745 A1 Nov. 11, 2010

(30) Foreign Application Priority Data
May 23, 2007 (FR) ...................................... 07 03651

(51) Int. Cl.
*G06F 3/043* (2006.01)
(52) U.S. Cl. ...................... 345/177; 345/173; 178/18.04
(58) Field of Classification Search .................. 345/153, 345/173, 179, 177; 178/18.04
See application file for complete search history.

(56) References Cited

U.S. PATENT DOCUMENTS

| 5,162,618 | A * | 11/1992 | Knowles | 178/18.04 |
| 6,741,237 | B1* | 5/2004 | Benard et al. | 345/173 |
| 7,345,677 | B2 | 3/2008 | Ing et al. | |
| 7,663,604 | B2* | 2/2010 | Maruyama et al. | 345/173 |
| 2004/0160421 | A1* | 8/2004 | Sullivan | 345/173 |
| 2005/0134574 | A1* | 6/2005 | Hill | 345/173 |
| 2005/0206627 | A1* | 9/2005 | Simmons | 345/179 |
| 2006/0034042 | A1* | 2/2006 | Hisano et al. | 361/681 |
| 2006/0097996 | A1* | 5/2006 | Tabata | 345/173 |
| 2006/0119588 | A1* | 6/2006 | Yoon et al. | 345/173 |
| 2006/0139339 | A1 | 6/2006 | Pechman et al. | |
| 2006/0152499 | A1* | 7/2006 | Roberts | 345/173 |
| 2008/0001803 | A1* | 1/2008 | Yamaji | 341/155 |

FOREIGN PATENT DOCUMENTS

| FR | 2 644 309 | 9/1990 |
| FR | 2 841 022 | 12/2003 |
| WO | WO 95/11499 | 4/1995 |
| WO | WO 03/067511 | 8/2003 |
| WO | WO 2006/133018 | 12/2006 |

* cited by examiner

Primary Examiner — Amare Mengistu
Assistant Examiner — Premal Patel
(74) Attorney, Agent, or Firm — McKenna Long & Aldridge LLP (57) ABSTRACT

For locating a touch on a tactile surface belonging to an object, mechanical waves are made to propagate in the object and these mechanical waves are picked up. Certain characteristics of the signal picked up are compared to a library of reference characteristics, and the position of the touch is deduced from this comparison.

39 Claims, 4 Drawing Sheets

METHOD FOR LOCATING A TOUCH ON A SURFACE AND DEVICE FOR IMPLEMENTING THE METHOD

This application is a 35 U.S.C. §371 National Stage entry of International Application No. PCT/FR2008/050810 filed May 7, 2008, which claims priority to French Application No. 0703651 filed May 23, 2007, both of which are hereby incorporated by reference for all purposes as if fully set forth herein in their entireties.

FIELD OF THE INVENTION

The present invention relates to methods for locating a touch on a surface and to devices for implementing these methods.

BACKGROUND OF THE INVENTION

More particularly, the invention relates to a method for locating a touch (for example of a finger, of a stylus or of another device) on a tactile surface belonging to an object, this method comprising at least the following steps:

(a) a monitoring step in the course of which mechanical waves are caused to propagate in the object from at least one emission point belonging to the object, and said mechanical waves are picked up at at least one reception point belonging to the object so as to obtain at least one picked-up signal, (b) and a location step in the course of which a touch on said tactile surface is located by analyzing the picked-up signal.

Document FR-A-2 644 309 describes an example of such a method which exhibits in particular the following drawbacks:
  it requires complex and expensive equipment, including a large number of transducers,
  and it exhibits limited resolution.

It is also known from document WO 2006/133018 to combine various touch location techniques known in the art, but at the cost of increased complexity.

Also known from documents FR-A-2 841 022 and WO 03/067511 are location techniques which use a passive principle, but it is not possible to detect touches having a very low impact energy with these passive procedures.

The aim of the present invention is in particular to alleviate these drawbacks.

OBJECTS AND SUMMARY OF THE INVENTION

For this purpose, according to the invention, a method of the kind in question is disclosed wherein, in the course of the location step, at least certain characteristics of the picked-up signal are compared with a library of reference characteristics, said reference characteristics corresponding respectively to touches in predetermined zones of said tactile surface.

By virtue of these provisions, a method for locating touch is obtained which does not require a large number of transducers (typically, it is possible to employ for example one transducer for emission and one or two transducers for reception) and which can nevertheless readily achieve millimetric location precision, making it possible in particular to produce a high-precision tactile interface (for example a touch screen, a touch keyboard or the like).

In various embodiments of the method according to the invention, it is optionally possible to resort furthermore to one and/or to another of the following provisions:

said characteristics of the picked-up signal that are used during the location step comprise at least one amplitude of the signal;

said characteristics of the picked-up signal that are used during the location step comprise at least one phase of the signal;

said characteristics of the picked-up signal that are used during the location step correspond to a number N of predetermined frequencies, N being an integer at least equal to 2, preferably at least equal to 10;

said predetermined frequencies are natural frequencies of the object, which are excited by said mechanical waves;

said predetermined frequencies are such that the spectrum of the signal received exhibits, at said predetermined frequencies, an amplitude greater than a threshold value;

said predetermined frequencies are separated pairwise by a gap greater than a predetermined minimum gap;

said predetermined minimum gap is at least equal to 150 Hz, preferably greater than 200 Hz and in a still more preferred manner greater than 300 Hz;

said predetermined frequencies are distributed in a span ranging from 10 to 100 kHz, preferably from 15 to 70 kHz;

at least one of said predetermined frequencies is less than 30 kHz and at least one of said predetermined frequencies is greater than 50 kHz;

the object used comprises a plate which forms said tactile surface;

said mechanical waves are Lamb waves;

said Lamb waves are flexural waves;

said Lamb waves are A0 antisymmetric waves;

the emission and reception points used in the course of the monitoring step are disposed so as not to be situated on any axis of symmetry of the object;

the monitoring step is repeated at a rate of several tens of times a second, preferably at least equal to 50 times a second;

in the course of the monitoring step, at least one waveform is emitted at at least one of said predetermined frequencies, for an emission time window of sufficient duration for resonances to be established in said object;

in the course of the monitoring step, a frame comprising N overlaid waveforms is emitted at the N predetermined frequencies (said N waveforms can be chosen for example from among sinusoidal waveforms and square waveforms);

said emission time window has a duration of between 10 and 25 ms (for example of the order of 16 ms);

in the course of the monitoring step, the mechanical waves are picked up for a reception time window having a duration of between 5 and 15 ms (for example of the order of 10 ms);

the reception time window at least partially overlaps the emission time window, said at least one reception point being distinct from said at least one emission point;

the reception time window follows the emission time window without overlapping it;

in the course of the monitoring step, a single emission point, merged with the reception point, is used;

in the course of the monitoring step, mechanical waves generated by an impulse signal (for example a notch-shaped signal whose width is less than half the period of the highest natural frequency) are emitted from the point of emission, and then said mechanical waves are picked up for a reception time window having a duration of between 5 and 15 ms;

in the course of the monitoring step, the picked-up signal is digitized on at least 8 quantization bits, preferably on at least 10 bits, and still more preferably on at least 12 bits;

in the course of the monitoring step, a relative absorption vector $A_{rel} = [Arel_n]$ of the acoustic waves is determined in terms of modulus and phase at the N predetermined frequencies, where:

$$Arel_n = (r_{im}/r0_{im})e^{j(\phi_{im} - \phi 0_{im})},$$

i is an index lying between 1 and N designating the predetermined frequency, m is an index lying between 1 and M designating the reception point, $$n = N(m-1) + i,$$

$r0_{im}$ is an amplitude value corresponding to the predetermined frequency i and to the reception point m in the absence of touch on the tactile surface, $r_{im}$ is an amplitude value corresponding to the predetermined frequency i and to the reception point m in the case of a touch on the tactile surface, $\phi 0_{im}$ is a phase value corresponding to the predetermined frequency i and to the reception point m in the absence of touch on the tactile surface, $\phi_{im}$ is a phase value corresponding to the predetermined frequency i and to the reception point m in the presence of touch on the tactile surface;

in the course of the monitoring step, a normalized centered relative absorption vector is determined $$Anor = \left[ \frac{Ac_n}{\sqrt{\sum_{n=1}^{M \cdot N} (Arel_n - \langle Arel \rangle)^2}} \right],$$

with $$Ac = [Ac_n] = [Arel_n - \langle Arel \rangle]$$

and $$\langle Arel \rangle = \frac{\sum_{n=1}^{M \cdot N} Arel_n}{N \cdot M};$$

in the course of the location step, the position of the touch is deduced from a cross-correlation test between an absorption vector related to the relative absorption vector $A_{rel}$ and at least one reference matrix consisting of a set of reference absorption vectors $A_{ref}(x_t, y_u)$ corresponding to touches at predetermined points with coordinates $(x_t, y_u)$ sampled on the tactile surface of the object;

in the course of the location step, the position of the touch is deduced from a cross-correlation test between a centered relative absorption vector $A_{nor}$ and at least one reference matrix consisting of a set of normalized centered relative reference absorption vectors $A_{ref}(x_t, y_u)$ corresponding to touches at predetermined points with coordinates $(x_t, y_u)$ sampled on the tactile surface of the object;

in the course of the location step, several reference matrices corresponding to several dimensions of touch are used, an dimension of the touch is deduced from the relative absorption vector $A_{rel}$ so as to determine the reference matrix to be used;

in the course of the location step, a sub-vector $A_{relx}$ corresponding to the natural frequencies that are most sensitive to the dimension of the touch is extracted from the relative absorption vector $A_{rel}$, and the modulus of this sub-vector $A_{relx}$ is calculated, then from this is deduced the reference matrix to be used to perform the cross-correlation operation and deduce from this the position of the touch;

to construct the sub-vector $A_{relx}$, only the natural frequencies for which the components of the relative absorption vector have a modulus of less than 1 and having a variation over the plate of less than a threshold value (typically 4%) are retained;

the reference matrix consists of a set of reference absorption vectors $A_{ref}(x_t, y_u)$ corresponding to touches at predetermined points with coordinates $(x_t, y_u)$ sampled on the tactile surface of the object with a spacing of less than half the wavelength of the smallest spatial frequency of the excitation spectrum;

in the course of the observation step, a modulus of the relative absorption vector is calculated and this modulus is compared with a predetermined threshold value to determine whether a touch has occurred on the tactile surface;

in the course of the observation step, a modulus of the relative absorption vector is calculated and this modulus is compared in the course of time with a particular dynamic profile (for example an increase followed by a fast decrease) to determine whether a touch has occurred on the tactile surface.

Moreover, the subject of the invention is also a device for locating a touch on a tactile surface belonging to an object, this device comprising at least one transducer adapted for emitting and picking up elastic waves in the object, said transducer being linked to at least one electronic central unit adapted for:

causing mechanical waves to be propagated in the object by said at least one transducer, and causing said mechanical waves to be picked up by said at least one transducer, and locating a touch on said tactile surface by analyzing the picked-up signal, wherein said electronic central unit is adapted for comparing at least certain characteristics of the picked-up signal with a library of reference characteristics, said reference characteristics corresponding respectively to touches in predetermined zones of said tactile surface.

In various embodiments of the device according to the invention, it is possible to resort furthermore to one and/or to another of the following provisions:

the device constitutes a touch keyboard;

the device is adapted for continuously moving a pointer over a display screen;

said at least one transducer is disposed away from any axis of symmetry of the object;

the object comprises a plate which includes said tactile surface;

the object is covered with an absorbent flexible film (at the level of the tactile surface or on an opposite face of the object) so as to increase the phenomenon of absorption of the elastic waves in the event of a touch.

BRIEF DESCRIPTION OF THE DRAWINGS

Other characteristics and advantages of the invention will be apparent in the course of the following description of several of its embodiments, given by way of nonlimiting examples, in conjunction with the appended drawings.

In the drawings.

MORE DETAILED DESCRIPTION

In the various figures, the same references designate identical or similar elements.

Figure 1:
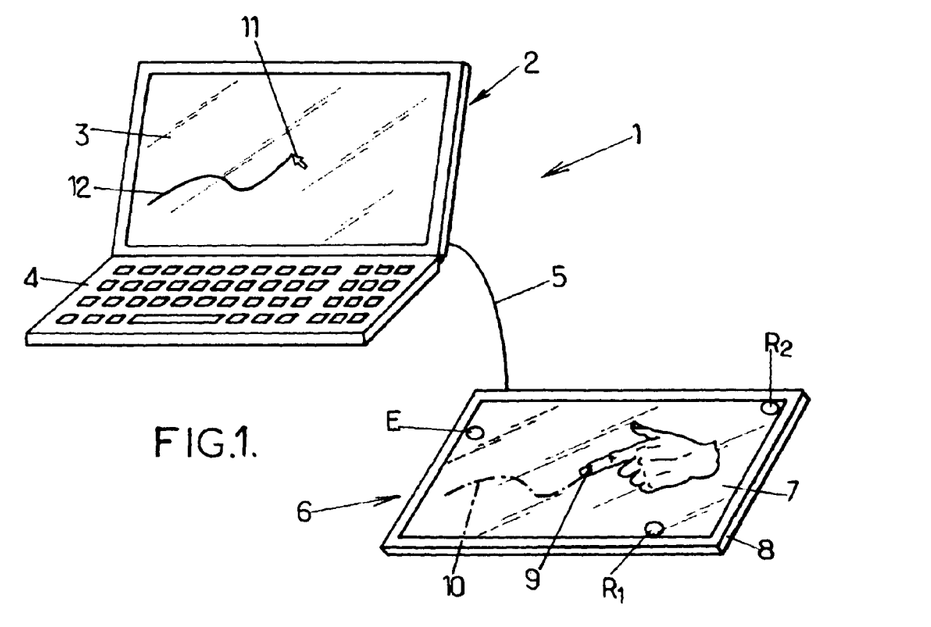
FIG. 1 is a schematic perspective view showing an exemplary device comprising a tactile interface adapted for implementing a method according to one embodiment of the invention.

FIG. 1 represents a device 1 intended to implement the present invention, which comprises for example:
- a micro-computer 2 furnished in particular with a screen 3 and a keyboard 4,
- and a tactile input interface 6, taking for example the form of a tablet, linked to the micro-computer by a link 5, wired or other.

The tactile interface 6 comprises a solid object which is resonant in respect of the elastic mechanical waves, for example a relatively thin plate 7, which can in particular be made of glass, or of metal, plastic, ceramic or other. The plate 7 can be made of a homogeneous or inhomogeneous, isotropic or nonisotropic material, optionally multilayered.

The plate 7 can optionally exhibit a substantially rectangular shape of dimensions L by 1 (see FIG. 2) defining an abscissa axis x and an ordinate axis y. The dimensions of the plate 7 can be chosen as a function of the envisaged application: for example, the plate 7 can be A4 format, or smaller (it is possible to envisage a plate 7 a few centimeters by a few centimeters), or larger (for example, l=300 mm and L=400 mm).

The plate 7 exhibits a thickness e (see FIG. 4) which can be of relatively low thickness, for example from 1 to 5 mm, in particular of the order of 4.5 mm in the case of an A4 format glass plate.

As represented in FIG. 1, the plate 7 can optionally be surrounded by a plastic or other frame 8 which can also overlap the lower face of the plate 7, only the upper face of the plate 7 being left free and forming a tactile surface in the particular example represented.

Figure 2:
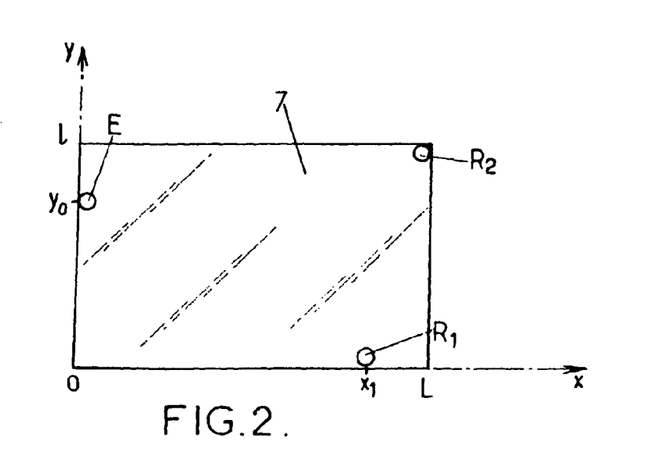
FIG. 2 is a plan view of a plate belonging to the acoustic interface of the device of FIG. 1.
Figure 3:
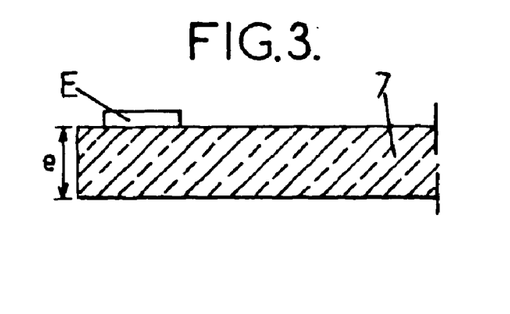
FIG. 3 is a partial sectional view of the plate of FIG. 2.

In the example of FIGS. 1 to 3, the plate furthermore comprises piezoacoustic transducers E, R1, R2 which can be fixed on the tactile upper face of said plate 7 (or if appropriate on its lower face).

The piezoacoustic transducers here comprise:
- an emission transducer E which serves to emit elastic mechanical waves (that is to say acoustic waves in the broad sense of the term), in particular Lamb waves, so as to establish regimes of resonance in the plate 7,
- and two reception transducers R1, R2 which serve to pick up signals representative of said mechanical waves.

The transducers E, R1, R2 are preferably disposed away from any axis of symmetry of the plate 7. In the example represented:
- the emission transducer E can be disposed on a side of the plate of length l and demarcating the y axis, at an emission point with abscissa x=0 and ordinate y=3 l/4,
- the first reception transducer R1 can be disposed on a side of length L demarcating the x axis, adjacent to the side which comprises the transducer E, at a first reception point with abscissa x=2L/3 and ordinate y=0,
- and the second reception transducer R2 can be disposed on the corner opposite the origin O of the abscissae and ordinates, at a second reception point with abscissa x=L and ordinate y=l.

For a plate with dimensions 300 mm×400 mm×4.5 mm, the transducers E, R1, R2 can have for example a size of about 1.5 $cm^2$. The excitation signal delivered to the emission transducer E can be for example 1 Vpp, and the reception signals picked up by the reception transducers R1, R2 can attain 0.4 Vpp and do not require any amplification.

The transducers can be low-cost piezoelectric wafers of "buzzer" type, for example mounted on brass disks, or ferroelectric ceramic transducers. They can be for example stuck onto the plate 7, in particular by means of an adhesive. They are stuck onto the plate by means of a rigid adhesive of the fast-setting 2-part epoxy type or ultra fast-setting "Cyanolit" type.

The piezoelectric transducers can if appropriate be replaced with magnetostrictive transducers.

The plate 7 can be fixed to the frame 8 preferably at vibration nodes of the natural modes of the mechanical waves in said plate.

As represented schematically in FIG. 1, the transducers E, R1, R2 make it possible to locate a touch on the tactile surface of the plate 7, for example when a user touches the tactile surface with his finger 9, or with a stylus or the like. For example, if the user describes a certain trajectory 10 with his finger 9 over the tactile surface of the plate 7, each point of this trajectory can be located by the tactile interface 6 and retransmitted to the micro-computer 2 which can thus move a cursor 11 over the screen 3 following a trajectory 12 which is the image of the abovementioned trajectory 10. Moreover, if a touch of low duration on the tactile surface is identified, this touch can be interpreted for example as signifying a selecting of an object (such as a "click" of a commonly used mouse or tactile interface). Likewise, a fast double touch in one and the same zone of the tactile surface can be interpreted as signifying an instigating of an action (such as a "double click" of a commonly used mouse or tactile interface).

The tactile surface of the plate 7 can also be used to constitute a programmable touch keyboard.

Figure 4:
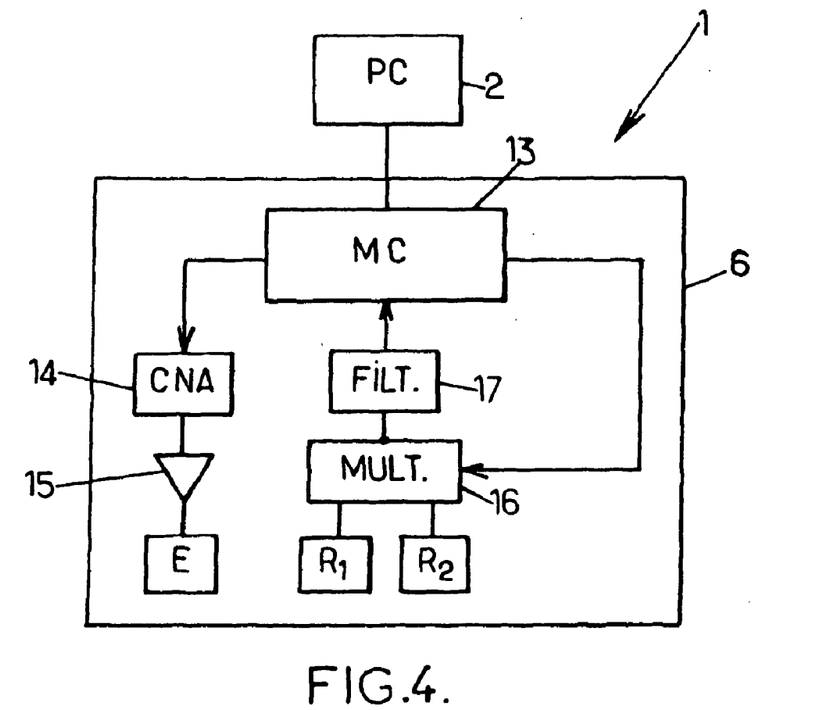
FIG. 4 is a block diagram of the device of FIG. 1.

As represented in FIG. 4, the tactile interface 6 can comprise a microcontroller 13 (MC), furnished for example with an arithmetic and logic unit. This microcontroller can comprise an output linked to a digital-analog converter 14 (DAC), whose output is linked by an amplifier 15 to the emission transducer E.

Moreover, the two reception transducers R1, R2 can be linked by a multiplexer 16 (MULT.) to the input of a bandpass filter 17. The multiplexer is controlled by the microcontroller 13. The bandpass filter 17 can exhibit for example a passband of 10 to 100 kHz, preferably of 15 to 70 kHz. The output of the bandpass filter 17 is linked to an analog input of the microcontroller 13 (if this microcontroller possesses an integrated analog-digital converter; otherwise, the output of the filter 17 is linked to a digital input of the microcontroller by way of an analog-digital converter). The analog-digital converter (optionally integrated into the microcontroller 13) is adapted for performing a sampling of the picked-up signals on at least 8 bits, preferably on 10 bits, or indeed on 12 or more bits.

The links to the transducers E, R1, R2 can consist in particular of audio-type coaxial cables or of any other shielded link.

The device which has just been described operates as follows: at regular intervals, for example at a rate of several tens of measurements a second, for example 50 to 100 measurements a second, the microcontroller 13 initiates a step of monitoring the tactile surface of the plate 7 followed by a location step in the course of which a touch, if any, on said tactile surface is identified and located.

a) Monitoring Step

In the course of each monitoring step, the microcontroller 13 causes elastic mechanical waves, in particular Lamb waves and more particularly flexural Lamb waves, to be emitted by the emission transducer E. These waves generate resonance phenomena in the plate 7 and are picked up by the reception transducers R1, R2. In the course of the location step which follows each monitoring step, certain characteristics of the signals measured by the reception transducers R1, R2 (in particular the amplitude and/or the phase of these signals) at a number N of predetermined frequencies, which are natural frequencies of the plate 7, are extracted. The number N of said predetermined frequencies is generally greater than 10 and can for example be of the order of 20 to 40. At least some (or indeed all) of said predetermined frequencies in question can advantageously correspond to A0 antisymmetric modes.

The abovementioned predetermined frequencies are generally chosen in advance from among the natural frequencies of the plate 7, once and for all, on the basis of the spectrum of the signals picked up by the reception transducers R1, R2, according to the following criteria:

said predetermined frequencies are such that the spectrum of the signal received exhibits, at said predetermined frequencies, an amplitude greater than a threshold value (it is for example possible in practice to select natural frequencies corresponding to quality factors of greater than 20);

said predetermined frequencies are well isolated and separated pairwise by a gap greater than a predetermined minimum gap (said predetermined minimum gap can for example be at least equal to 150 Hz, preferably greater than 200 Hz and in a still more preferred manner greater than 300 Hz; the predetermined frequencies must preferably be spaced apart by at least three times the mid-height passband of the spectral lines apart, i.e. in practice generally from 300 to 500 Hz);

said predetermined frequencies are distributed over the monitored range of frequencies (for example 10 to 100 kHz, preferably 15 to 70 kHz, as explained above): by way of example, it is possible to ensure that at least one of said predetermined frequencies is less than 30 kHz and that at least one of said predetermined frequencies is greater than 50 kHz;

the predetermined frequencies must preferably correspond to natural modes corresponding to low spatial frequencies for certain natural modes and high ones for others: indeed, the modes exhibiting high spatial frequencies are often complex and make it possible to obtain good resolution, but are often characterized by a high degree of symmetry, that is to say several touches at different places can correspond to the same absorption coefficients, whereas the modes exhibiting low spatial frequencies have simpler patterns, and make it possible to remove the symmetry problems, the combination of the two enabling the location of the touch to be truly optimized.

It will be noted that the choice of the abovementioned predetermined frequencies can be performed experimentally on each plate 7, or more advantageously on each type of plate 7 and then reused routinely for all the plates 7 of the same type (a type of plate 7 corresponding to plates of the same dimensions and same material).

Several methods are usable for performing this monitoring at the abovementioned N predetermined frequencies.

Figure 9:
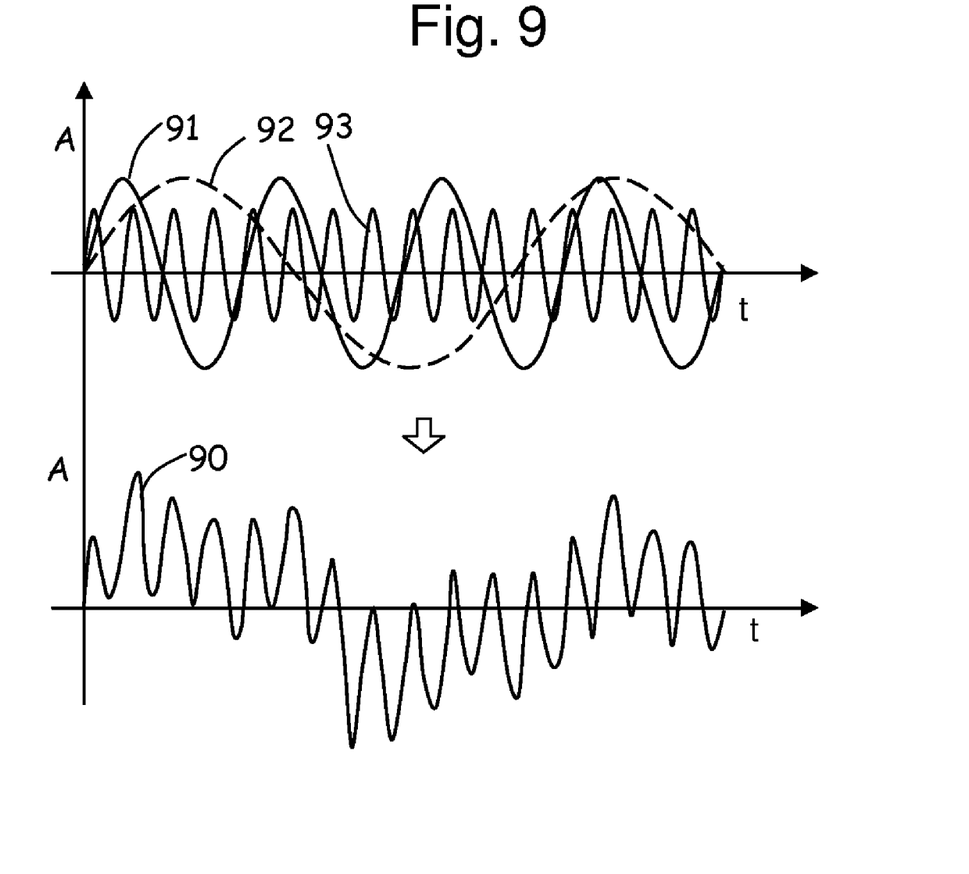
FIG. 9 illustrates an example of an emitted composite signal.

According to a first advantageous method, as exemplified in FIG. 9, the microcontroller 13 can cause the transducer E to emit a composite signal 90 comprising N overlaid waveforms 91, 92, and 93 at the N predetermined frequencies (said N waveforms can for example be chosen from among sinusoidal waveforms and square waveforms). This emission can be performed for an emission time window of sufficient duration for resonances to be established in the plate 7. This duration can for example be between 10 and 25 ms, and in particular be of the order of 16 ms.

In the course of the monitoring step, the mechanical waves can be picked up by the reception transducers R1, R2 during a reception time window which is included (or at least overlaps) in the emission time window but can start after the latter so as to allow the resonances to be established in the plate 7 before the start of said reception time window. The reception time window can exhibit a duration of between 5 and 15 ms; it can for example be of the order of 10 ms and start about 6 ms after the emission time window.

As a variant, the reception time window could follow the emission time window without overlapping it: in this case, it would optionally be possible to use only a single transducer E serving both for emission and for reception.

According to another variant, it is possible to cause mechanical waves generated by an impulse signal (for example a notch-shaped signal whose width is less than half the period of the highest natural frequency) to be emitted by the emission transducer E, and then to cause said mechanical waves to be picked up (by the reception transducer or transducers R1, R2 or if appropriate by the same transducer E) for a reception time window having a duration of between 5 and 15 ms.

According to one embodiment of the invention, on the basis of the signals picked up by the reception transducers R1, R2 and sampled, it is possible to extract for example the amplitudes of the signals picked up at said predetermined frequencies (by Fourrier transform or by digital synchronous detection), i.e. $r_{im}$, i being an index between 1 and N which designates the predetermined frequency and m being an index here lying between 1 and 2 which designates the reception transducer R1, R2. It will be noted that it is possible to balance the waveforms on emission as a function of the frequencies so as to equalize the amplitudes of the signals picked up at said predetermined frequencies in the absence of touch on the tactile surface.

The phase of the signals picked up by the reception transducers R1, R2 at said predetermined frequencies is also extracted, i.e. $\phi_{im}$, i being an index between 1 and N which designates the predetermined frequency and m being an index here lying between 1 and 2 which designates the reception transducer R1, R2.

These extractions of data, as well as the calculations which follow, can be performed by the microcontroller 13 if it has an arithmetic and logic unit, or otherwise by the computer 2.

On the basis of these data, a complex absorption vector $A_{rel}$ is calculated for each transducer:

$A_{rel} = [Arel_n]$, where:

n=i+N.(m−1) is an integer lying between 1 and 2N in the example considered here since M=2 (n would lie between 1 and N for a single reception transducer with M=1), $$Arel_n = (r_{im}/r0_{im})e^{j(\phi_{im} - \phi 0_{im})},$$

$r0_{im}$ is an amplitude value corresponding to the natural frequency i and to the reception transducer m in the absence of touch on the tactile surface, determined beforehand and once and for all in an initial teaching step which will be described later on, $\phi 0_{im}$ is a phase value corresponding to the natural frequency i and to the reception transducer m in the absence of touch on the tactile surface, determined beforehand and once and for all in the initial teaching step.

It will be noted that the $r0_{im}$ and $\phi 0_{im}$ could optionally be corrected automatically of foreseeable variations due for example to the ambient temperature conditions or to aging.

On the basis of the relative absorption vector $A_{rel}$ a centered relative absorption vector is calculated $$Ac = [Ac_n] = [Arel_n - \langle Arel \rangle] \text{ and } n=i+N(m-1),$$

$$\langle Arel \rangle = \frac{\sum_{n=1}^{M \cdot N} Arel_n}{N \cdot M},$$

N is the number of predetermined frequencies taken into account and M the number of reception transducers (here M=2).

The centered relative absorption vector is thereafter normalized to obtain a normalized centered relative absorption vector $$Anor = \left[ \frac{Ac_n}{\sqrt{\sum_{n=1}^{M \cdot N} (Arel_n - \langle Arel \rangle)^2}} \right]$$

which is used to detect and locate a touch on the tactile surface, by means of reference matrices obtained in the course of the abovementioned initial teaching step.

Moreover, it is possible to use the modulus of the relative absorption vector $A_{rel}$ to detect a touch according to a threshold criterion and/or variation over time criterion (for the definition of a click, of a double click etc.). The modulus of the relative absorption vector $A_{rel}$ is equal to:

$$|A_{rel}| = \frac{\sqrt{\sum_{n=1}^{M \cdot N} (|Arel_n| - 1)^2}}{\sqrt{M \cdot N}}.$$

If the modulus of the relative absorption vector is greater than a predetermined threshold value or if the evolution of this modulus in the course of time corresponds to a particular dynamic profile (for example an increase followed by a fast decrease), the microcontroller 13 determines that a touch has occurred on the tactile surface and thereafter proceeds to the location step. Otherwise, a new observation step is instigated, after a predetermined time interval.

a0) Initial Teaching Step

Before any use of the tactile interface 6, an initial teaching step, which can be conducted either for each individual tactile interface 6 or for each type of tactile interface 6, is carried out.

This initial teaching step is carried out like the observation step described above, but under predetermined conditions making it possible to obtain certain reference values used thereafter in the observation and location steps during the normal use of the device.

In the course of this initial teaching step, it is in particular possible to determine the above-mentioned values $r0_{im}$ and $\phi_{im}$ on the basis of the signals picked up by the transducers R1, R2 in the absence of touch on the tactile surface of the plate 7, in the same manner as the values $r_{im}$ and $\phi_{im}$ are determined (see the observation step above). These values $r0_{im}$ and $\phi 0_{im}$ are thereafter used in the course of each observation step, as explained above.

Moreover, in the course of the initial teaching step, reference absorption matrices $A_k\text{ref} = [A_k\text{ref}_n(x_t, y_u)]$ are also calculated, used thereafter in the course of the observation steps. The terms $A_k\text{ref}_n(x_t, y_u)$ of each reference absorption matrix correspond to the components of the normalized centered relative absorption vectors, determined as explained above (see the observation step) for touches at predetermined points with coordinates $(x_t, y_u)$ sampled on the tactile surface, t and u being indices relating to the position of the touch and k being an index relating to the characteristic dimension of the touch.

The characteristic dimension in question is representative of the contact surface area between the tactile surface and the object or the finger touching the tactile surface.

The spatial sampling frequency must be sufficiently high and generally at least equal to double the upper limit of the spectrum of spatial frequencies observed for the resonant modes retained. A sampling spacing of 3 mm along the x and y axes may for example be chosen.

Figure 6:
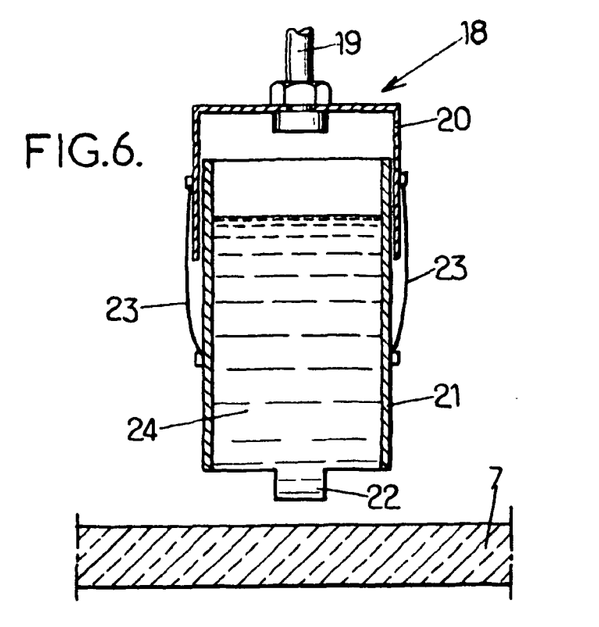
FIG. 6 is a schematic sectional view of a device usable for sampling the acoustic interface of FIG. 1 in a prior teaching phase.

The reference absorption matrices can be obtained by using for example a gauge finger 18 such as that represented in FIG. 6, carried by a robotized arm 19 which applies the gauge finger 18 successively to the various points with coordinates $(x_u, y_t)$ on the tactile surface. In the particular example of FIG. 6, the gauge finger 18 can comprise a support 20 on which can slide vertically a main reservoir of polyurethane 21 molded at the bottom in the form of a circular or rectangular contact shoe 22 intended to come into contact with the tactile surface of the plate 7. The reservoir 21 is linked to the support 20 by elastic links 23 (for example rubber bonds) and it contains for example a predetermined mass 24 of silicone resin (for example of the order of 20 g). When the gauge finger 18 is deposited on the tactile surface, always at the same speed, with one and the same contact pad 22 and with the same relative travel between the support 20 and the reservoir 21, the contact pad always produces the same contact with the tactile surface. Contact pads 22 of different surface areas are used for the various values of k. For example, it is possible to use circular contact pads of diameters 3 mm, 5 mm, 7 mm, 10 mm, 15 mm (but the shape of the contact pad 22 could be non-circular, for example oval or square). At least one of the values of the index k must preferably correspond to a contact pad of small size, with a characteristic dimension that is ideally twice as small as the highest spatial frequency observed on the tactile surface for a resonance pattern. In this way, it is thereafter possible to determine the surface area covered by fingers of larger size by applying a moving average over several elements of the matrix corresponding to the contact area.

It will be noted that it would optionally be possible to use only a single reference matrix by disregarding the contact area of the touch, in particular if the touches are normalized (for example if the touches are carried out with the aid of a stylus).

b) Location Step

After each monitoring step, the microcontroller 13 (or optionally the micro-computer 2) instigates a location step, making it possible to locate a touch, if any, on the tactile surface of the plate 7, by comparing at least certain characteristics of the picked-up signal with a library of reference characteristics, said reference characteristics corresponding respectively to touches in predetermined zones of said tactile surface. In the example considered here, the reference values in question are the reference matrices explained above.

These reference matrices are used in each location step to calculate a cross-correlation function between:
- the reduced, centered and normalized absorption vector Anor determined in the course of the current location step,
- and each of the elements $A_k \text{ref}_n (x_t, y_u)$ of one of the reference matrices (or of the reference matrix if only a single reference matrix is used).

The choice of the suitable reference matrix $A_k(x_i, y_i)$, that is to say of the index k corresponding to the size of the appropriate gauge finger, is deduced from the modulus of the relative absorption vector $A_{rel}$.

For this purpose, those natural frequencies for which the absorption varies the most as a function of the contact area of the touch are determined in advance, for one and the same type of object. For example, for a glass plate of 200 mm×141 mm×1 mm, it is observed that the spectral lines lying between 25 kHz and 35 kHz vary more (almost proportionately) with the contact area of the touch. A sub-vector $A_{relx}$ corresponding to the resonant spectral lines that are most sensitive to the contact area of the touch is then extracted from the relative absorption vector $A_{Arel}$, and the modulus of this sub-vector $A_{relx}$ is calculated. The value of this modulus gives, as a function of a correspondence table, the reference matrix k to be used to perform the cross-correlation operation and deduce therefrom the position of the touch.

For the choice of the natural frequencies corresponding to the abovementioned sub-vector, it is optionally possible only to use natural frequencies characterized by a coefficient $\text{Arel}_n$ of less than 1 in modulus and having a variation over the plate of less than a threshold value, for example 4% [this signifying that the modulus of the absorption sub-vector $A_{relx}$ varies by less than 4% with respect to an average value over the whole plate]. In this case, although the modulus of the relative absorption sub-vector $A_{relx}$ is lower on average over the plate, it is however more uniform over the plate with a lower standard deviation, thereby rendering the measurement of overlapping surface area more reliable. This constitutes a fourth criterion for selecting the natural frequencies. The modulus of the relative absorption vector extracted is then a monotonic increasing function of the overlapping surface area:

$$\left\{ |A_{relx}(x, y)| = \frac{\sqrt{\sum_{i=1}^{p} (|Arel_i(x, y)| - 1)^2}}{\sqrt{p}}, \right.$$
$$0 < 1 - |Arel_i(x, y)| < 4\%$$

where $p \leq N$ is the number of natural frequencies used to construct the vector $A_{relx}$.

Once the appropriate reference matrix k has been determined and after the abovementioned cross-correlation step, the position of the touch on the tactile surface is determined and transmitted to the micro-computer 2 which positions the pointer 11 accordingly on the screen, or which records the striking of a character if the tablet 6 is used as a keyboard.

It will be noted that the object comprising the tactile surface and equipped with the transducer or transducers E, R1, R2 could be:
- the screen 3 of the micro-computer 2,
- a screen of a mobile telephone, electronic diary, payment terminal,
- an LCD, plasma, DLP, FED, SED, OLED screen, etc.,
- a relatively flexible metal or plastic sheet, usable as a sensory interface in robotics or as a keyboard with programmable touch keys,
- a glazing or other surface in a store, a museum, an art gallery or the like, to allow customers or visitors to elicit details on a screen or by means of a loudspeaker relating to the products or the works exhibited,
- a glazing or other surface of a display panel allowing passers-by to elicit for example details on the advertisements currently on display, or else to elicit general information relating to a district or another site (for example, current events or practical information, for example a plan of the site), or suchlike, these details or this information being presented for example on a visible screen in the bottom part of the display panel,
- a portion of wall, of the floor, or of any other object used for example to control home-automation systems (it is thus possible in particular to allow the residents of an apartment to themselves determine the locations of the switches, consisting simply of the abovementioned active zones 10, positioned on the walls or the like in the desired places),
- a portion of wall, of the floor, or of any other object used to control industrial machines in particular in a hostile environment (sites containing explosives, high-temperature sites, high-radioactivity sites, etc.),
- a smooth and easily serviced surface to constitute an input keypad of a domestic object such as a refrigerator, washing machine or the like, or of an object for industrial or military ends,
- a property door panel used as an input interface, constituting for example a digicode virtual keyboard,
- a floor portion used to locate the position of a person walking above,
- a portion of an automobile or other vehicle forming an input interface.

Among the advantages of the invention may be noted low cost/performance ratio, low consumption, immunity to temperature variations, tolerance to the shapes of the resonating object, and high precision of location, which can be millimetric.

Figure 5:
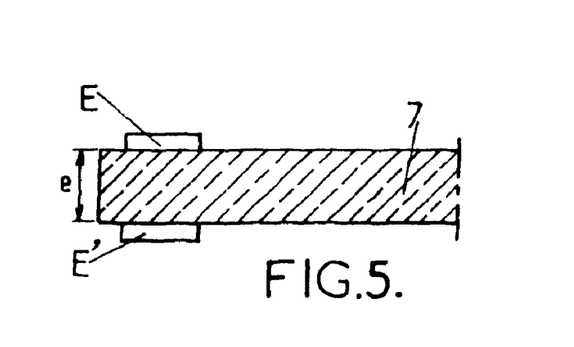
FIG. 5 is a view similar to FIG. 3, in a second embodiment of the invention.
Figure 7:
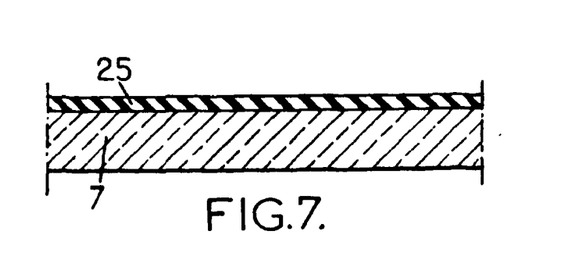
FIGS. 7 and 8 are views similar to FIG. 3, in third and fourth embodiments of the invention.

According to one variant of the invention, as represented in FIG. 5, each emission or reception point could comprise two transducers (for example the transducers E and E' for the emission point in FIG. 7) arranged opposite one another on either side of the plate 7. This arrangement makes it possible to carry out selective emission/reception of the modes:
- if the transducers (for example E, E') of each pair are connected in parallel, the S0 symmetric mode is selected for emission and reception (the reception transducers are arranged in a manner similar to the emission transducers E, E'), if the transducers of each pair are connected in antiparallel fashion, the A0 antisymmetric mode is selected for emission and reception.

According to another variant, represented in FIG. 7, the plate 7 can be covered by a flexible plastic film 25 in dry contact with the upper face of said plate 7, at the level of the tactile surface. The film 25 is absorbent in respect of the elastic waves, and which makes it possible to obtain greater absorption when the tactile surface receives a touch, in particular when it receives a touch by a slender object such as a stylus. The film 25 can advantageously be in dry contact with the plate 7, without being intimately bonded thereto by adhesive, that is to say imprisoning a slender layer of air in the irregularities of the interface. The absorption function is then ensured by the film 25 when it is pressed locally against the plate and no longer by the fleshy part of the finger or the tip of a stylus applied against the film 25.

Figure 8:
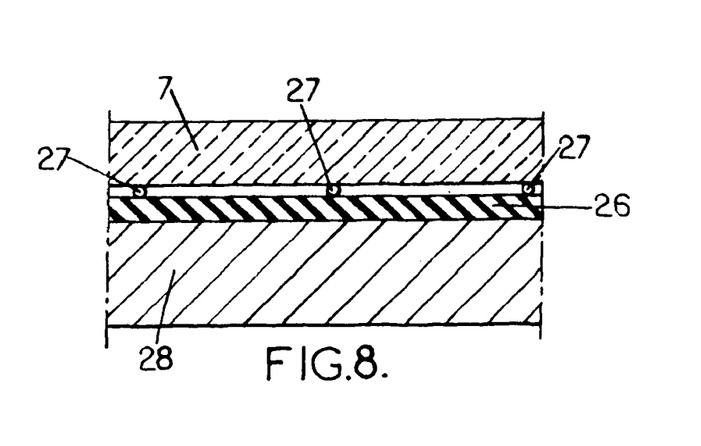

As represented in FIG. 8, an absorbent flexible plastic film 26, similar to the abovementioned film 25, can be interposed between:

the plate 7, which in this case exhibits some flexibility,
and a rigid substrate 28.

Spacers 27 of small dimensions (micro beads or the like) can be interposed between the plate 7 and the film 26, so that the plate 7 comes into contact with the film 26 solely at the level of the location of the touch of a stylus or of a finger or the like on the plate 7. The absorption of the elastic waves is then done by the film 26 at the level of the touch.

Optionally, the plate 7 can then consist of the upper plate of an LCD screen, the absorbent film 26 being the liquid crystal itself of the LCD screen.

The invention claimed is:

1. A method for locating a touch on a tactile surface of an object comprising:
    (a) a monitoring step during which a plurality of mechanical waves are caused to propagate to in the object from an emitter transducer on the object, to establish vibratory natural resonance frequencies in the object, and said plurality of mechanical waves are detected at a receiver transducer on the object, said receiving transducer generates a picked-up signal in response to the mechanical waves detected; and
    (b) a location step during which the touch on said tactile surface is located by analyzing the picked-up signal,
    wherein said plurality of mechanical waves comprise at least two frequency components corresponding to at least two vibratory natural resonance frequencies of the object, and wherein characteristics of the picked-up signal are compared with a library of reference characteristics, said reference characteristics corresponding respectively to a plurality of touches in predetermined zones of said tactile surface,
    wherein frequency components of the plurality of mechanical waves include a number, N, of frequency components corresponding to at least N vibratory natural predetermined frequencies of the object, and in which said characteristics of the picked-up signal correspond to the at least N vibratory natural predetermined frequencies, N being an integer greater than or equal to 2.

2. The method as claimed in claim 1, in which said characteristics of the picked-up signal comprise an amplitude of the picked-up signal.

3. The method as claimed in claim 1, in which said characteristics of the picked-up signal comprise a phase of the picked-up signal.

4. The method as claimed in claim 1, in which said predetermined frequencies are such that a spectrum of the picked-up signal exhibits, at said predetermined frequencies, an amplitude greater than a predetermined threshold value.

5. The method as claimed in claim 1, in which any two of the predetermined frequencies among said N predetermined frequencies are separated from each other by a frequency gap greater than a predetermined minimum gap.

6. The method as claimed in claim 5, in which said predetermined minimum gap is at least 150 Hz.

7. The method as claimed in claim 1, in which said predetermined frequencies are distributed in a span ranging from 10 to 100 kHz.

8. The method as claimed in claim 7, in which one of said predetermined frequencies is less than 30 kHz and at least a different one of said predetermined frequencies is greater than 50 kHz.

9. The method as claimed in claim 1, in which the object comprises a plate, a surface of which forms said tactile surface.

10. The method as claimed in claim 1, in which said mechanical waves are Lamb waves.

11. The method as claimed in claim 10, in which said Lamb waves are flexural waves.

12. The method as claimed in claim 11, in which said Lamb waves are A0 antisymmetric waves.

13. The method as claimed in claim 1, in which the emitter transducer and the reception transducer are not disposed on an axis of symmetry of the object.

14. The method as claimed in claim 1, in which the monitoring step is repeated at a rate of several tens of times a second.

15. The method as claimed in claim 1, in which the emitter transducer is excited by a waveform is comprised of at least one of said predetermined frequencies, for an emission time window of sufficient duration for the resonances to be established in said object.

16. The method as claimed in claim 15, in which the waveform is comprised of the N predetermined frequencies.

17. The method as claimed in claim 15, in which said emission time window has a duration of between 10 and 25 ms.

18. The method as claimed in claim 15, in which the plurality of mechanical waves are detected in a reception time window having a duration of between 5 and 15 ms.

19. The method as claimed in claim 18, in which the reception time window at least partially overlaps the emission time window and the receiver transducer is different from the emitter transducer.

20. The method as claimed in claim 18, in which the reception time window follows the emission time window without overlapping it.

21. The method as claimed in claim 20, in which the emitter transducer and the receiver transducer are the same transducer.

22. The method as claimed in claim 1, in which the plurality of mechanical waves are generated by an impulse signal and are detected in a reception time window having a duration of between 5 and 15 ms.

23. The method as claimed in claim 1, in which the picked-up signal is digitized on at least 8 quantization bits.

24. The method as claimed in claim 1, in which M receiver transducers are used and N and M are positive integers, a relative absorption vector $A_{rel}=[Arel_n]$ is determined in terms of a modulus and a phase at the N predetermined frequencies, where:

$$Arel_n = (r_{im}/r0_{im})e^{j(\phi_{im}-\phi0_{im})},$$

i is an index lying between 1 and N designating which of the predetermined frequencies is being considered, m is an index lying between 1 and M designating which of the receiver transducers is being considered, $$n=i+N(m-1),$$

$r0_{im}$ is an amplitude value corresponding to the predetermined frequency i and to the receiver transducer m in the absence of the touch on the tactile surface, $r_{im}$ is an amplitude value corresponding to the predetermined frequency i and to the receiver transducer m in the presence of the touch on the tactile surface, $\phi0_{im}$ is a phase value corresponding to the predetermined frequency i and to the receiver transducer m in the absence of the touch on the tactile surface, $\phi_{im}$ is a phase value corresponding to the predetermined frequency i and to the receiver transducer m in the presence of the touch on the tactile surface.

25. The method as claimed in claim 24, in which a normalized centered relative absorption vector, Anor, is determined by:

$$Anor = \left[ \frac{Ac_n}{\sqrt{\sum_{n=1}^{M \cdot N} (Arel_n - \langle Arel \rangle)^2}} \right],$$

with $Ac=[Ac_n]=[Arel_n-\langle Arel \rangle]$ and $$\langle Arel \rangle = \frac{\sum_{n=1}^{M \cdot N} Arel_n}{N \cdot M}.$$

26. The method as claimed in claim 25, in which a position of the touch is determined from a cross-correlation test between the normalized centered relative absorption vector $A_{nor}$ and a reference matrix comprising a set of normalized centered relative reference absorption vectors $A_{ref}(x_t, y_u)$ corresponding to a plurality of touches at predetermined points, respectively, with spatial coordinates $(x_t, y_u)$ on the tactile surface of the object.

27. The method as claimed in claim 26, in which the reference matrix further comprises a set of reference absorption vectors $A_{ref}(x_t, y_u)$ corresponding to a plurality of touches at a plurality of predetermined points, respectively, with spatial coordinates $(x_t, y_u)$ on the tactile surface of the object with a spacing of less than half the wavelength of the lowest spatial frequency of the excitation signal.

28. The method as claimed in claim 25, in which a modulus of the relative absorption vector is calculated and the calculated modulus is compared with a predetermined threshold value to determine whether a touch has occurred on the tactile surface.

29. The method as claimed in claim 25, in which a modulus of the relative absorption vector is calculated with respect to time and the calculated modulus is compared over time with a dynamic profile to determine whether a touch has occurred on the tactile surface.

30. The method as claimed in claim 24, in which a position of the touch is determined from a cross-correlation test between an absorption vector related to the relative absorption vector $A_{rel}$ and a reference matrix comprising a set of reference absorption vectors $A_{ref}(x_t, y_u)$ corresponding to a plurality of touches at predetermined points, respectively, with spatial coordinates $(x_t, y_u)$ on the tactile surface of the object.

31. The method as claimed in claim 30, in which a first matrix corresponding to a contact surface area between the tactile surface and an object touching the tactile surface is used to determine the reference matrix.

32. The method as claimed in claim 31, in which a sub-vector $A_{relx}$ corresponding to a plurality of predetermined frequencies that are most sensitive to the contact surface area is determined from the relative absorption vector $A_{rel}$, and a modulus of the sub-vector $A_{relx}$ is calculated and used to determine the reference matrix.

33. The method as claimed in claim 32, in which only the predetermined frequencies for which the components of the relative absorption vector having a modulus of less than 1 and having an amplitude variation over the object of less than a threshold value are retained to derive the sub-vector $A_{relx}$.

34. A device for locating a touch on a tactile surface of an object, the device comprising at least one transducer configured to emit and detect elastic waves in the object, said transducer being linked to an electronic central unit configured to:
cause a plurality of mechanical waves to propagate in the object, to establish vibratory natural resonance frequencies in the object, by said at least one transducer, and causing said mechanical waves to be detected by said at least one transducer, and
locate a detected signal,
wherein said plurality of mechanical waves comprise at least two frequency components corresponding to at least a number N of vibratory natural resonance frequencies of the object, and wherein said electronic central unit is configured to compare at least certain characteristics of the detected signal corresponding to the at least N vibratory natural resonance frequencies of the object with a library of reference characteristics, said reference characteristics corresponding respectively to a plurality of touches in a plurality of predetermined zones, respectively, of said tactile surface, N being an integer greater than or equal to 2.

35. The device as claimed in claim 34, comprising a touch keyboard.

36. The device as claimed in claim 34, configured as a pointer for a display screen.

37. The device as claimed in claim 34, in which said at least one transducer is disposed away from an axis of symmetry of the object.

38. The device as claimed in claim 34, in which the object comprises a plate which includes said tactile surface.

39. The device as claimed in claim 34, in which the object is covered with a flexible film to increase an absorption of the elastic waves in the event of a touch.

* * * * *